(12) United States Patent  
Itagaki

(10) Patent No.: US 7,856,164 B2  
(45) Date of Patent: Dec. 21, 2010

(54) WAVEGUIDE DEVICE

(75) Inventor: Youichi Itagaki, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 181 days.

(21) Appl. No.: 11/991,074

(22) PCT Filed: Aug. 31, 2006

(86) PCT No.: PCT/JP2006/317263

§ 371 (c)(1),
(2), (4) Date: Feb. 27, 2008

(87) PCT Pub. No.: WO2007/026843

PCT Pub. Date: Mar. 8, 2007

(65) Prior Publication Data

US 2009/0257713 A1    Oct. 15, 2009

(30) Foreign Application Priority Data

Aug. 31, 2005   (JP) .............................. 2005-251622

(51) Int. Cl.
G02B 6/10 (2006.01)
G02B 6/32 (2006.01)

(52) U.S. Cl. ...................................... 385/129; 385/33

(58) Field of Classification Search .................. 385/33, 385/49, 50, 129

See application file for complete search history.

(56) References Cited

U.S. PATENT DOCUMENTS 6,804,423 B2 *  10/2004  Tsukamoto et al. ........... 385/14

| 2002/0051599 | A1 | 5/2002 | Tsukamoto et al. |
| 2003/0061836 | A1 | 4/2003 | Higuchi et al. |
| 2004/0096152 | A1 | 5/2004 | Nakama et al. |
| 2004/0126064 | A1 | 7/2004 | Vandentop et al. |

FOREIGN PATENT DOCUMENTS

| DE | 10160508 | 6/2003 |
| JP | 2-727 | 1/1990 |
| JP | 03-271706 | 12/1991 |
| JP | 11-248953 | 9/1999 |
| JP | 2001-166167 | 6/2001 |
| JP | 2001-281486 | 10/2001 |
| JP | 2003-172837 | 6/2003 |
| JP | 2004-170716 | 6/2004 |
| JP | 2004-191564 | 7/2004 |
| JP | 2004-309552 | 11/2004 |
| JP | 2004-361858 | 12/2004 |
| WO | WO2005/062083 | 7/2005 |

OTHER PUBLICATIONS

Chinese Office Action dated Jun. 5, 2009 with partial translation.
Extended European search report dated May 7, 2010.

* cited by examiner

*Primary Examiner*—Sarah Hahm
(74) *Attorney, Agent, or Firm*—IPUSA, PLLC

(57) ABSTRACT

A waveguide device that guides light through a core part formed in a cladding part is disclosed. The waveguide device includes a waveguide part formed in the cladding part so as to have the same refractive index as the refractive index of the core part so that the waveguide part communicates with the core part, and a reflective part configured to perform at least one of reflecting the light guided by the core part toward the waveguide part and reflecting light from the waveguide part toward a direction in which the light is guided by the core part.

6 Claims, 10 Drawing Sheets

WAVEGUIDE DEVICE

TECHNICAL FIELD

The present invention relates generally to waveguide devices, and more particularly to a waveguide device that guides light through a core part formed in a cladding part.

BACKGROUND ART

As increases in the clock frequencies of CPUs have made it possible to process large amounts of data, problems such as noise resulting from increases in signal transmission speed and crosstalk between signal lines have become serious, so that the limits of high-speed transmission through a metal interconnection line using a CPU have started to appear. Therefore, vigorous studies have been made of optical data communications as means for transmitting large amounts of data.

In the case of using light in data communications, it is possible not only to achieve high speed but also to solve the problem of crosstalk between interconnections because of the characteristics of optical data communications. Therefore, in the case of long-distance signal transmission, optical communications using optical fibers have been commonly used. Optical communications are also effective in the case of signal transmission of an extremely short distance as between boards or circuits. Studies have been made of a polymeric optical waveguide because of its compatibility with a printed wiring board (PWB) for the case of applying optical communications in signal transmission of an extremely short distance as between boards or circuits.

The polymeric optical waveguide used in optical interconnections is a relatively large multi-mode waveguide of approximately 50 μm in core diameter because of short transmission distance. The key to its realization is how easily it can be connected to light-receiving and light-emitting elements.

There are proposed optical waveguides in which a mirror disposed at an angle to a core, and a lens formed of the same member as a cladding or the core and focusing light onto the mirror, are provided in order to facilitate alignment of the optical axes of a module and the waveguide (see Patent Documents 1, 2, and 3).

[Patent Document 1] Japanese Laid-Open Patent Application No. 2001-166167

[Patent Document 2] Japanese Laid-Open Patent Application No. 2001-281486

[Patent Document 3] Japanese Laid-Open Patent Application No. 2004-361858

DISCLOSURE OF THE INVENTION

Problems to be Solved by the Invention

The polymeric optical waveguide has attracted attention as an optical transmission line, for example, between circuit boards or in a circuit board, and it remains an issue how efficiently it can be joined to light-receiving and light-emitting elements.

Means for Solving the Problems

In a preferred embodiment of the present invention, a waveguide device is provided that allows efficient joining to light-receiving and light-emitting elements.

In a preferred embodiment of the present invention, a waveguide device is provided that guides light through a core part formed in a cladding part, the waveguide device including a waveguide part formed in the cladding part so as to have the same refractive index as the refractive index of the core part so that the waveguide part communicates with the core part, and a reflective part configured to perform at least one of reflecting the light guided by the core part toward the waveguide part and reflecting light from the waveguide part toward a direction in which the light is guided by the core part.

Effects of the Invention

According to one embodiment of the present invention, by providing a waveguide device with a waveguide part formed in a cladding part so as to have the same refractive index as the refractive index of a core part so that the waveguide part communicates with the core part, and a reflective part configured to perform at least one of reflecting light guided by the core part toward the waveguide part and reflecting light from the waveguide part toward a direction in which the light is guided by the core part, it is possible to introduce light from a direction perpendicular to the direction in which the light is guided by the core part into the core part. Accordingly, it is possible to perform surface-mounting and reduce the thickness of the waveguide device.

BRIEF DESCRIPTION OF THE DRAWINGS

Other objects, features and advantages of the present invention will become more apparent from the following detailed description when read in conjunction with the accompanying drawings, in which.

DESCRIPTION OF REFERENCE NUMERALS

Figure 1:
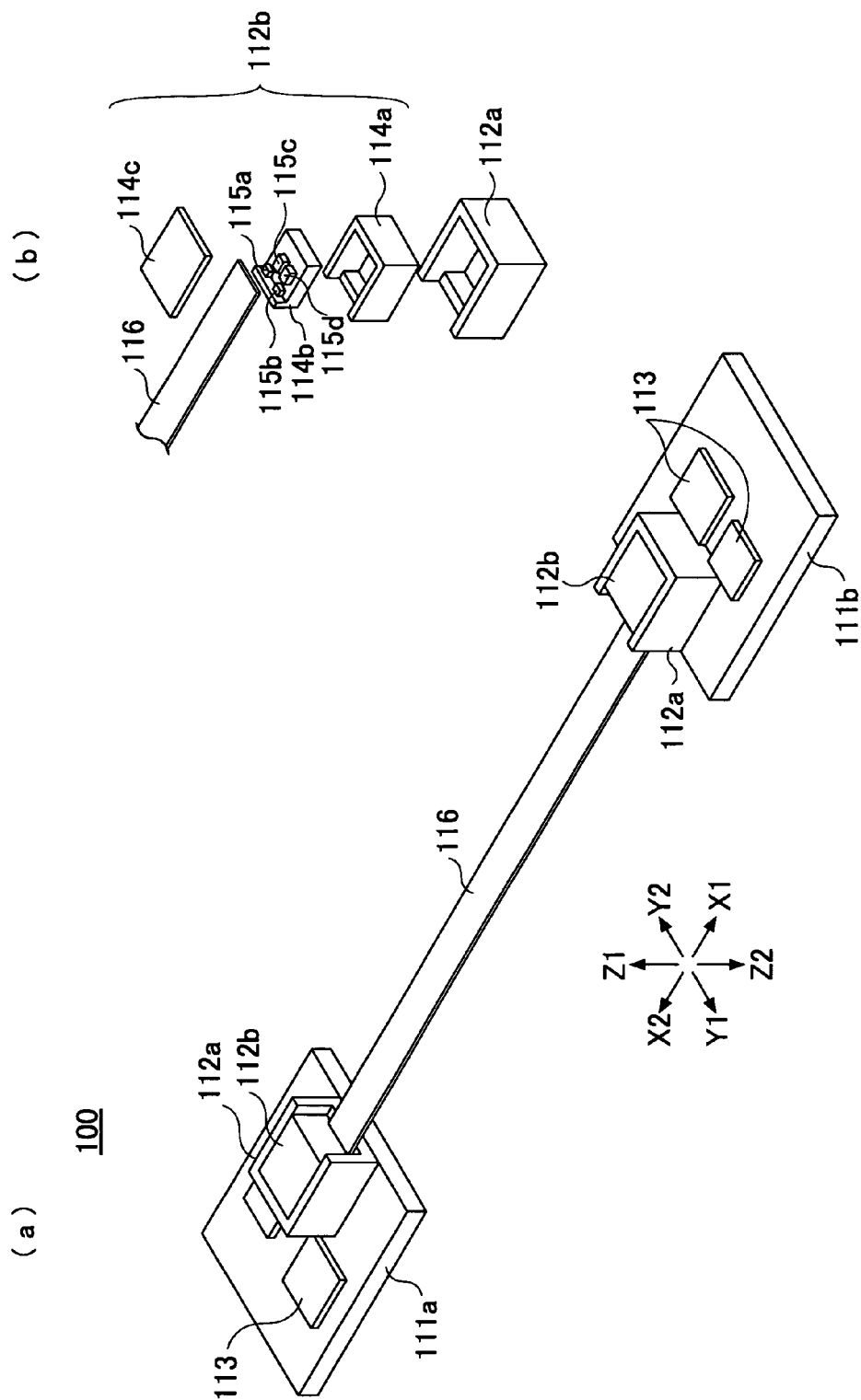
FIG. 1 is a diagram for illustrating a system configuration according to one embodiment of the present invention.

100 system
111a, 111b printed wiring board 112a, 112b connector
113a, 113b IC chip
114a case, 114b board, 114c cover
115a light-emitting element, 115b light-receiving element, 115c driver, 115d amplifier
116, 211, 311 optical interconnection device
121, 122 film substrate, 123 lens layer, 123a, 123b lens
124, 125 cladding layer 124a, 124b light guard part
126 core part, 127, 128 reflective surface

BEST MODE FOR CARRYING OUT THE INVENTION

A description is given below, with reference to the accompanying drawings, of embodiments of the present invention.

FIG. 1 is a diagram for illustrating a system configuration according to one embodiment of the present invention.

Referring to (a) of FIG. 1, a system 100 according to this embodiment has a configuration where a printed wiring board 111a and a printed wiring board 111b, so-called "boards," are optically joined by an optical interconnection device 116. IC chips 113 and a connector 112a are mounted on each of the printed wiring boards 111a and 111b. The connector 112a may be, for example, a socket.

Each connector 112a has a corresponding connector 112b electrically connected thereto. Each connector 112b has a corresponding end part of the optical interconnection device 116 optically connected thereto, thereby connecting the optical interconnection device 116 and the printed wiring boards 111a and 111b.

Referring to (b) of FIG. 1, each connector 112b includes a case 114a, a board 114b, and a cover 114c. A light-emitting element 115a, a light-receiving element 115b, a driver 115c, and an amplifier 115d are mounted on the board 114b. The board 114b is housed in the case 114a.

The corresponding end part of the optical interconnection device 116 is disposed in the case 114a so as to oppose the light-emitting element 115a and the light-receiving element on the board 114b. The light-emitting element 115a, which is formed of, for example, a vertical cavity surface emitting LED (VCSEL), converts an electrical signal from the printed wiring board 111a (or 111b) into light and emits the light in the direction of arrow Z1 perpendicular to the printed wiring board 111a (or 111b). The optical interconnection device 116 is disposed in the direction in which the light is emitted in the case 114a. The light emitted from the light-emitting element 115a enters the optical interconnection device 116.

Further, the light-receiving element 115b converts the light from the optical interconnection device 116 into an electrical signal, and feeds the electrical signal to the printed wiring board 111a (or 111b). The driver 115c and the amplifier 115d amplify an electrical signal from the printed wiring board 111a (or 111b) and feed the amplified electrical signal to the light-emitting element 115a, and/or amplify an electrical signal from the light-receiving element 115b and feeds the amplified electrical signal to the printed wiring board 111a (or 111b).

The cover 114c closes the opening face of the case 114a, thereby housing the board 114b and the corresponding end part of the optical interconnection device 116 inside the case 114a. The board 114b and the optical interconnection device 116 are fixed in the case 114a so as to be in predetermined positions relative to each other.

The optical interconnection device 116 bends the light emitted in the Z1 direction from the light-emitting element 115a toward the direction of arrow X1 or X2, and guides the light to its other end. The light guided through the optical interconnection device 116 is bent toward the direction of arrow Z2 at the X1 or X2-side end part of the optical interconnection device 116. The lower surface or Z2-side surface of the X1 or X2-side end part of the optical interconnection device 116 is disposed so as to oppose the light-receiving element 115b.

Thereby, the light guided by the optical interconnection device 116 to its X1 or X2-side end part is bent toward the Z2 direction so as to enter the light-receiving surface of the light-receiving element 115b. The light-receiving element 115b, which has its light-receiving surface formed to be perpendicular to the Z1 and Z2 directions, converts the light emitted from the optical interconnection device 116 into an electrical signal. The electrical signal obtained by the conversion in the light-receiving element 115b is fed through the connectors 112a and 112b to the printed wiring board 111a or 111b, and is processed in the IC chips 113.

Figure 2:
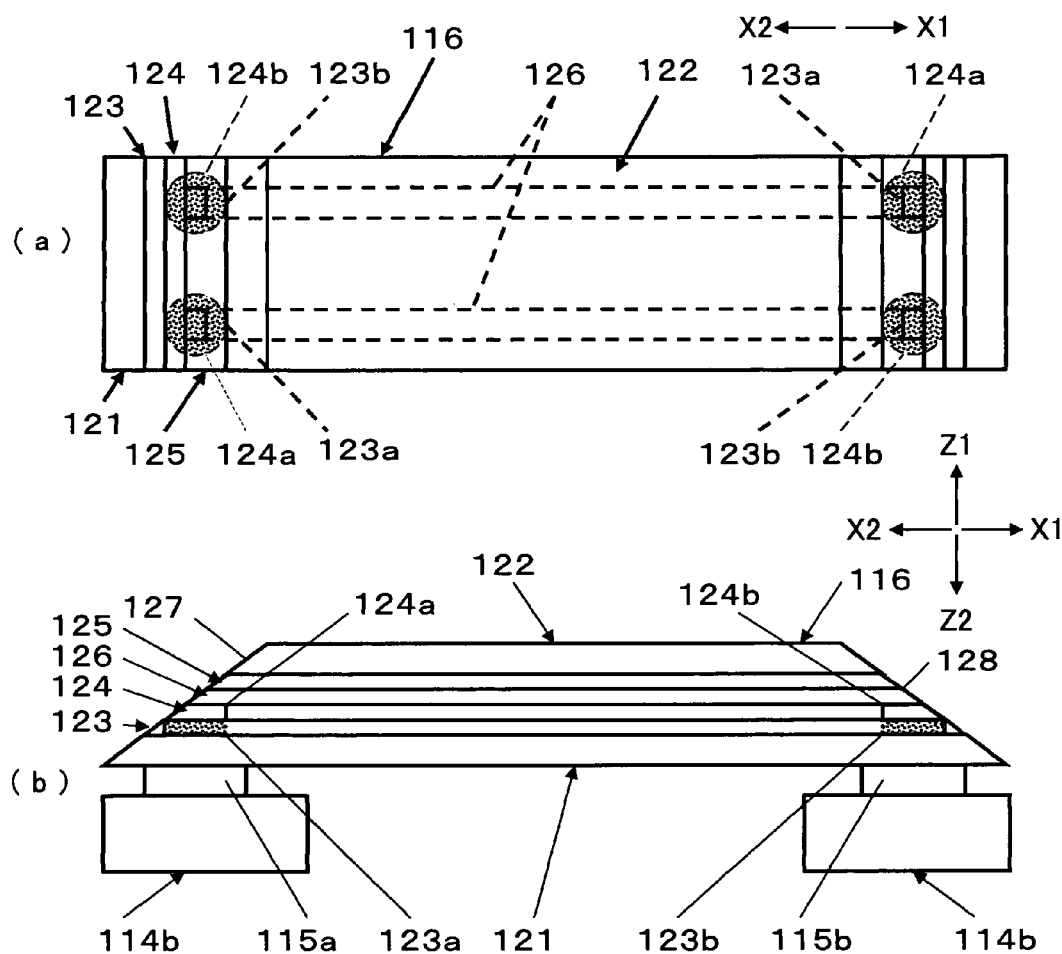
FIG. 2 is a diagram showing a configuration of an optical interconnection device according to the embodiment of the present invention.

FIG. 2 is a diagram showing a configuration of the optical interconnection device 116.

The optical interconnection device 116 includes film substrates 121 and 122, a lens layer 123, cladding layers 124 and 125, a core part 126, and reflective surfaces 127 and 128.

The film substrates 121 and 122, which are formed of resin films of, for example, polyimide, PET, or PEN serve as a base and a cover, respectively.

The lens layer 123 is formed on the film substrate 121. Lenses 123a and 123b are formed in the lens layer 123. A first pair of the lens 123a and the lens 123b is formed in one end part of the optical interconnection device 116 and a second pair of the lens 123a and the lens 123b is formed in the other end part of the optical interconnection device 116 so that the lens 123a and the lens 123b of the first pair correspond to the lens 123b and the lens 123a of the second pair, respectively ((a) of FIG. 2).

Each of the lenses 123a and 123b is formed by irradiating the lens layer 123 with, for example, ultraviolet rays so as to hemispherically have a refractive index different from that of the other part of the lens layer 123. That is, each of the lenses 123a and 123b is a hemispherical or hemispherically shaped part different in refractive index from the other part of the lens layer 123. Each lens 123a collimates light provided from the film substrate 121 side to the core part 126. Each lens 123b focuses light bent toward the Z2 direction from the core part 126 onto the light-receiving surface of the light-receiving element 115.

Light guide parts 124a and 124b are formed in the parts of the cladding layer 124 opposing the lenses 123a and 123b, respectively. The refractive index of the light guide parts 124a and 124b is controlled by irradiation of ultraviolet rays so as to be substantially the same as the refractive index of the core part 126. In this case, the light guide parts 124a and 124b may be formed by forming holes in the cladding layer 124 and embedding a core material in the holes using photolithography.

The core part 126 is formed linearly in the X1 and X2 directions on the cladding layer 124. The material of the core part 126 is controlled so that the core part 126 is different in refractive index from the cladding layer 124 except the light guide parts 124a and 124b. The shape of the core part 126 is not limited to a linear shape, and can be freely changed with a radius of curvature larger than a bend limit determined by the core-cladding refractive index difference. The cladding layer 125, whose material is controlled so that the cladding layer 125 is equal in refractive index to the cladding layer 124 except the light guide parts 124a and 124b, is stacked on the core part 126 and the cladding layer 124. As a result, the core part 126 is enclosed by the cladding layers 124 and 125 which have a different refractive index from the core part 126. Enclosing the core part 126 with the cladding layers 124 and 125 different in refractive index from the core part 126 causes the core part 126 to serve as a waveguide for transmitting light.

Referring to (b) of FIG. 2, the reflective surface 127, which defines the X2 end face of the optical interconnection device 116 inclined at an angle of 45 degrees to the Z1 direction, bends light emitted from the light-emitting element 115a and entering from the Z2 direction toward the X1 direction. The reflective surface 128, which defines the X1 end face of the optical interconnection device 116 inclined at an angle of 45 degrees to the Z1 direction, bends the light entering from the X2 direction toward the Z2 direction to cause the light to enter the light-receiving surface of the light-receiving element 115b.

The film substrate 122, which is applied on the cladding layer 125, covers the cladding layer 125. The cladding layers 124 and 125, the core part 126, and the lens layer 123 are formed of polyimide resin, polysilane-type resin, epoxy resin, or acrylic resin.

[Method of Manufacturing the Optical Interconnection Device 116]

Figure 3:
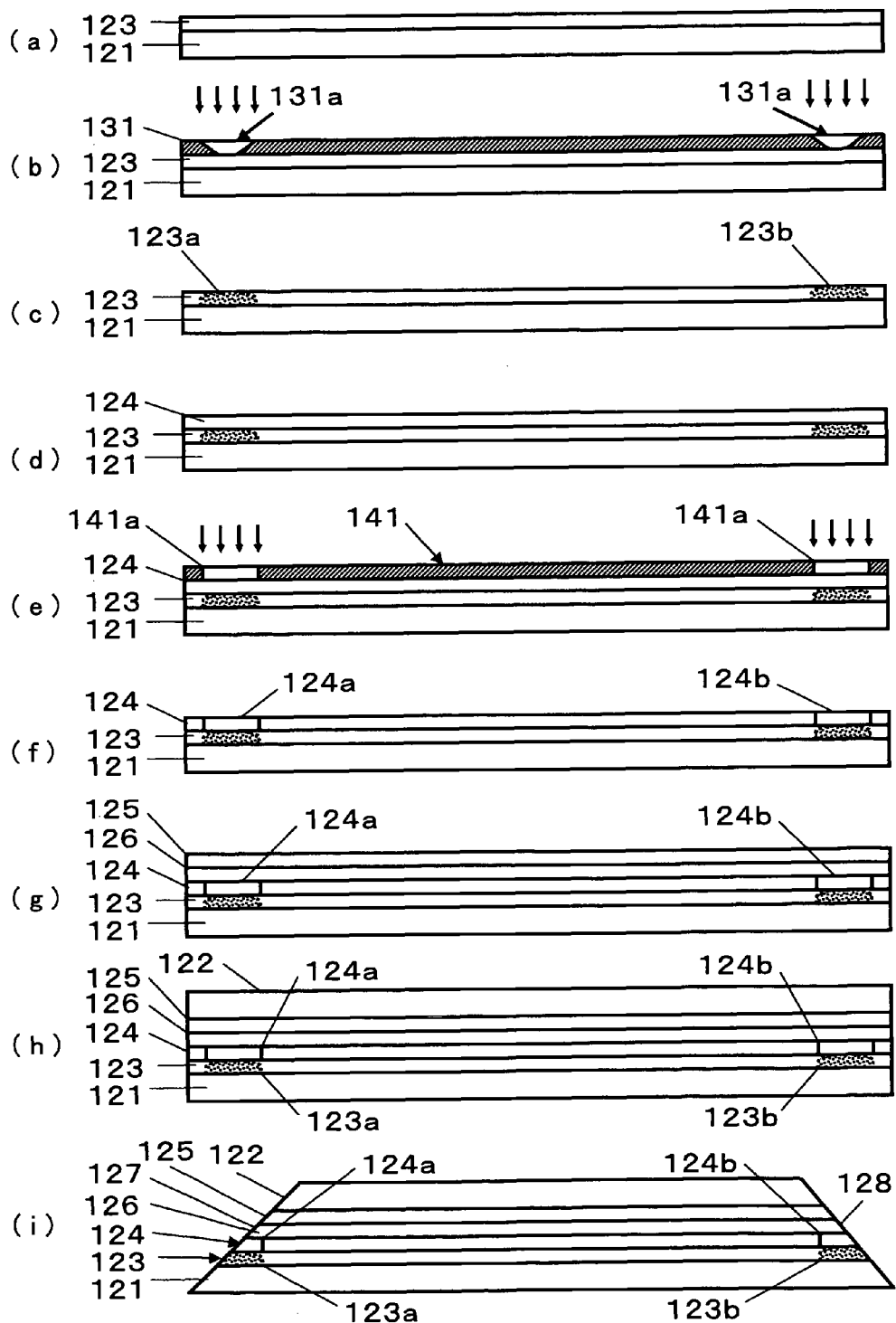
FIG. 3 is a diagram for illustrating a method of manufacturing the optical interconnection device according to the embodiment of the present invention.

FIG. 3 is a diagram for illustrating a method of manufacturing the optical interconnection device 116.

First, as shown in (a) of FIG. 3, the lens layer 123 is formed evenly on the film substrate 121. Next, as shown in (b) of FIG. 3, a photomask 131 is superposed on the lens layer 123, and irradiation of ultraviolet rays is performed from above the photomask 131. Openings 131a are formed in the parts of the photomask 131 where the lenses 123a and 123b are to be formed. Each of the openings 131a is formed to have a substantially hemispheric cross-sectional shape.

When the lens layer 123 is irradiated with ultraviolet rays, its refractive index changes. Therefore, irradiation of ultraviolet rays from above the photomask 131 causes the parts of the lens layer 123 on which the openings 131a are formed to be different in refractive index from the other part of the lens layer 123. At this point, each opening 131a of the photomask 131 is formed so as to have a substantially hemispheric cross-sectional shape, so that the ultraviolet rays are large in amount in the center part of the opening 131a and small in amount in the peripheral part of the opening 131a because of the difference in the amount of transmission of the ultraviolet rays. As a result, as shown in (c) of FIG. 3, the lenses 123a and 123b are hemispherically formed in the parts of the lens layer 123 corresponding to the openings 131a in the photomask 131 so as to be different in refractive index from the other parts of the lens layer 123.

Next, as shown in (d) of FIG. 3, the cladding layer 124 is formed on the lens layer 123. After formation of the cladding layer 124, as shown in (e) of FIG. 3, a photomask 141 is superposed on the cladding layer 124, and irradiation of ultraviolet rays is performed from above the photomask 141. Openings 141a are formed in the parts of the photomask 141 corresponding to where the lenses 123a and 123b are formed. Each opening 141a has a substantially rectangular cross-sectional shape.

When the cladding layer 124 is irradiated with ultraviolet rays, its refractive index changes. By irradiation of ultraviolet rays from above the photomask 141, as shown in (f) of FIG. 3, the light guide parts 124a and 124b provided with substantially the same refractive index as the refractive index of the core part 126 are formed in the parts of the cladding layer 124 on which the openings 141a of the photomask 141 are formed. The method of forming the core part 126 is not limited to this.

Next, as shown in (g) of FIG. 3, the core part 126 and the cladding layer 125 are formed on the cladding layer 124. The core part 126 is formed to be a predetermined path by etching. Next, as shown in (h) of FIG. 3, the film substrate 122 is applied on the cladding layer 125.

After the application of the film substrate 122, as shown in (i) of FIG. 3, the reflective surfaces 127 and 128 are formed with the portions of the core part 126 corresponding to the lenses 123a and 123b serving as end faces. The reflective surfaces 127 and 128 are formed by cutting the parts of the structure of (h) of FIG. 3 on the lenses 123a and 123b at an inclination of 45 degrees using a blade or laser light. Each of the reflective surfaces 127 and 128 may be formed to bend light traveling through the substantial center of each lens 123a so that the light enters the core part 126, and to bend light traveling through the core part 126 so that the light passes through the substantial center of each lens 123b.

[Operations]

Figure 4:
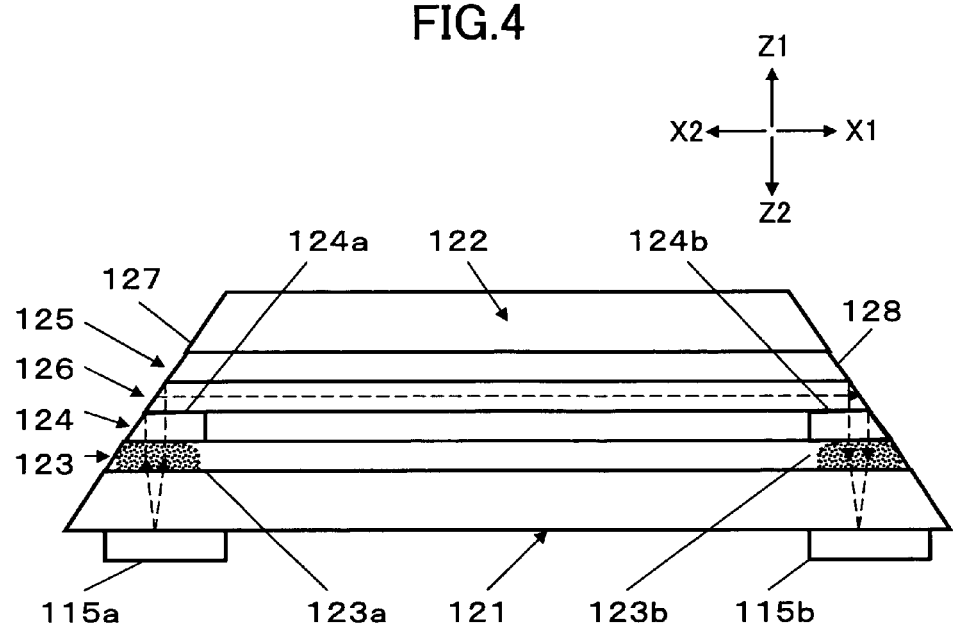
FIG. 4 is a diagram for illustrating an operation of the optical interconnection device according to the embodiment of the present invention.

FIG. 4 is a diagram for illustrating an operation of the optical interconnection device 116.

Referring to FIG. 4, light is emitted toward the Z1 direction from the light-emitting element 115a, and enters the lens 123a of the optical interconnection device 116. The lens 123a collimates the light from the light-emitting element 115a. The light collimated by the lens 123a is provided to the reflective surface 127, which reflects the light toward the X1 direction. The reflected light travels through the core part 126 to be incident on the reflective surface 128, which reflects the light from the core part 126 toward the Z2 direction. The light reflected by the reflective surface 128 is provided to the lens 123b. The lens 123b focuses the light from the reflective surface 128 onto the light-receiving surface of the light-receiving element 115b.

[Effects]

According to this embodiment, the lenses 123a and 123b are integrated into the optical interconnection device 116, and it is easy to provide optical interconnection using the surface mountable light-emitting element 115a such as VCSEL and the surface mountable light-receiving element 115b. Accordingly, it is possible to reduce projection from the surface of the printed wiring board 111a (111b). Further, since light is collimated and gathered by the lenses 123a and 123b, it is possible to reduce loss of light.

Further, at this point, it is also possible to run an interconnection pattern or to provide an electronic component below the optical interconnection device 116.

Further, according to this embodiment, it is possible to adjust the focal length of each of the lenses 123a and 123b by controlling the thickness of the cladding layer 124.

Figure 5:
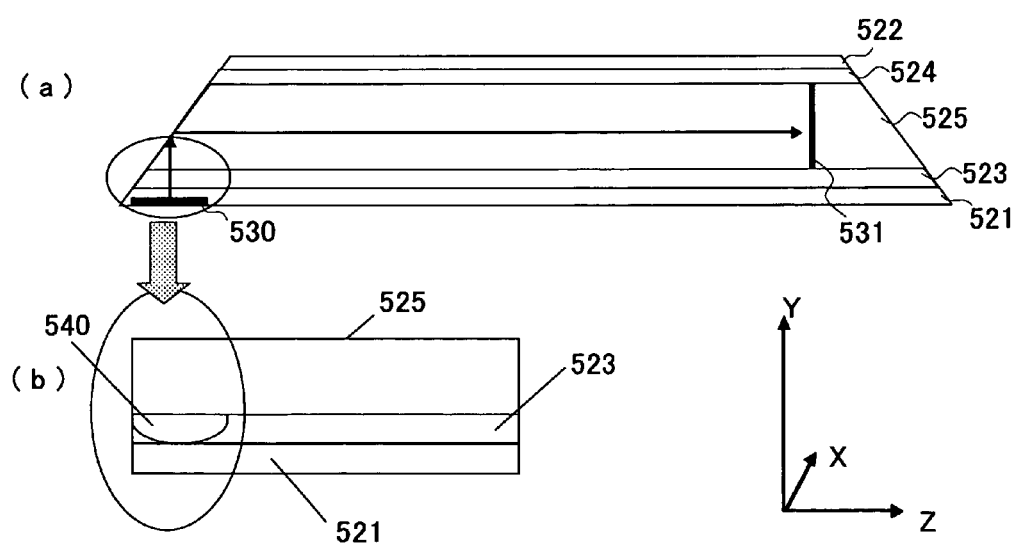
FIG. 5 is a diagram showing a model used for calculating a connection loss improvement effect by providing a lens layer according to the embodiment of the present invention.

Here, a connection loss improvement effect by providing a lens layer is calculated using a model shown in FIG. 5. An optical interconnection device model 500 shown in FIG. 5 includes protection layers 521 and 522, a lower cladding layer (lens layer) 523, an upper cladding layer 524, a core layer 525, a light source 530, a detector 531, and a lens 540. The loss calculation is performed under the following conditions. The refractive indices and radii of curvature of the lens layer 523 at the time when the lower cladding layer 523 is 10 μm and 50 μm in thickness are employed as parameters. As shown in FIG. 5, the lens 540 is formed in the lower cladding layer 523. Ray tracking is employed. The loss at the time of moving the light source 530 in the X, Y, and Z directions is calculated.

Figure 6:
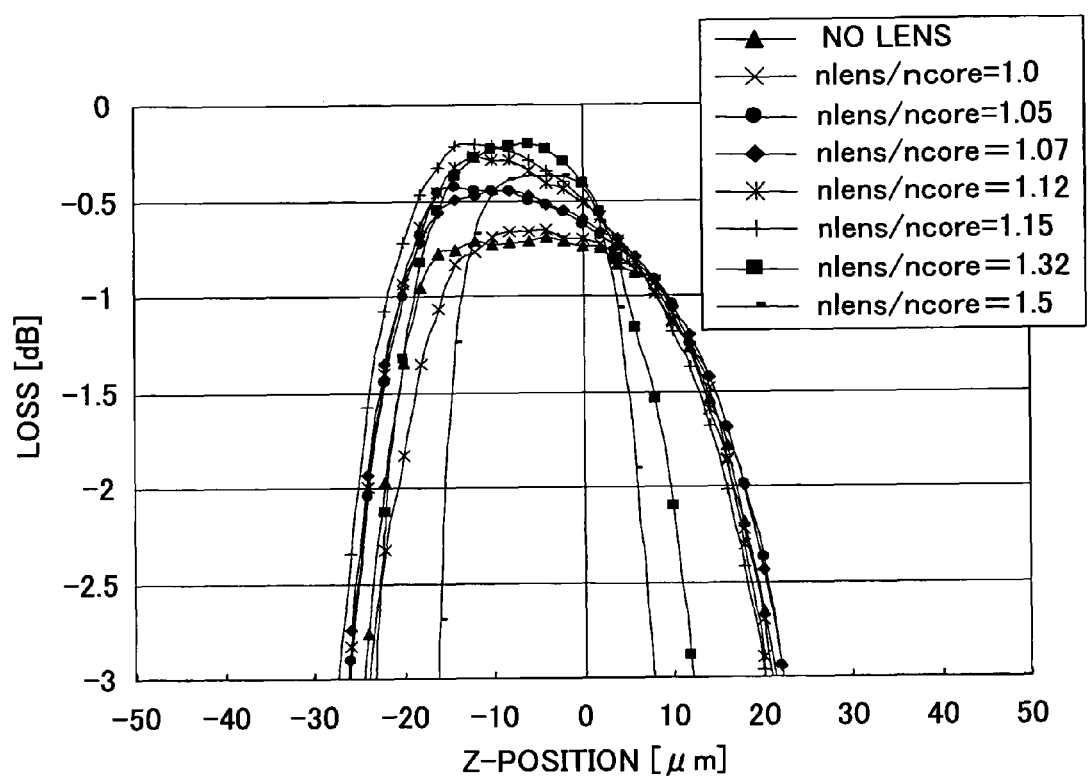
FIG. 6 is a graph for illustrating the connection loss improvement effect according to the embodiment of the present invention.
Figure 7:
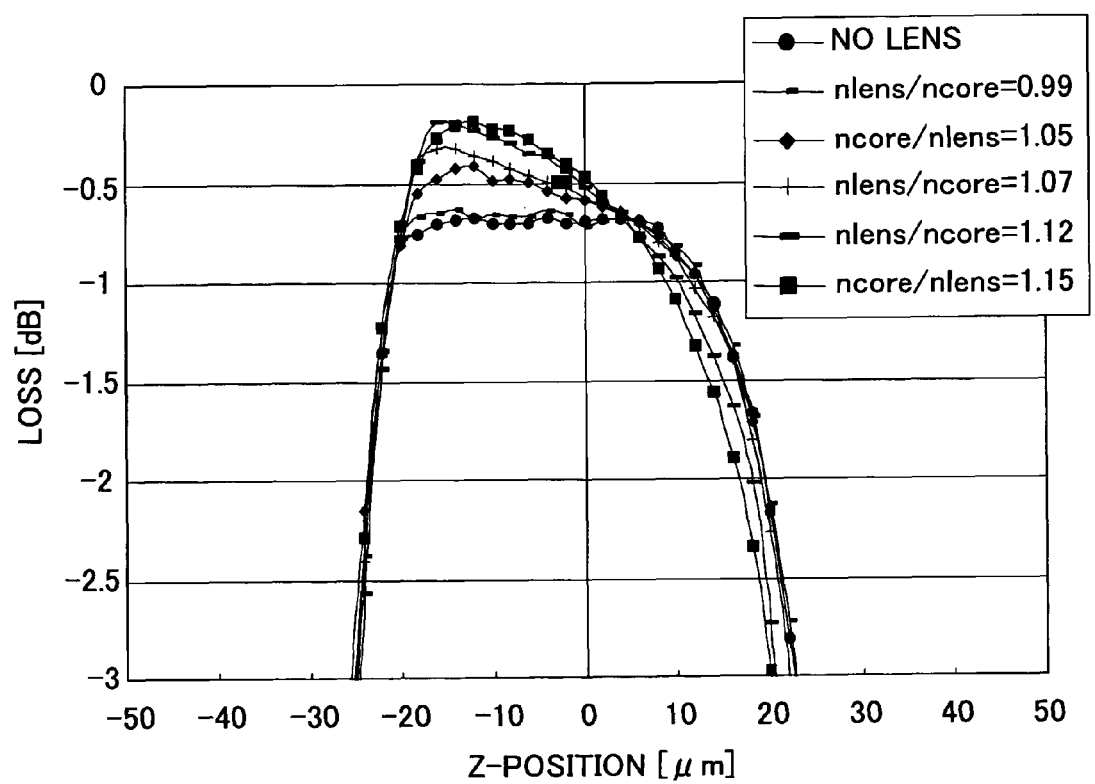
FIG. 7 is another graph for illustrating the connection loss improvement effect according to the embodiment of the present invention.
Figure 8:
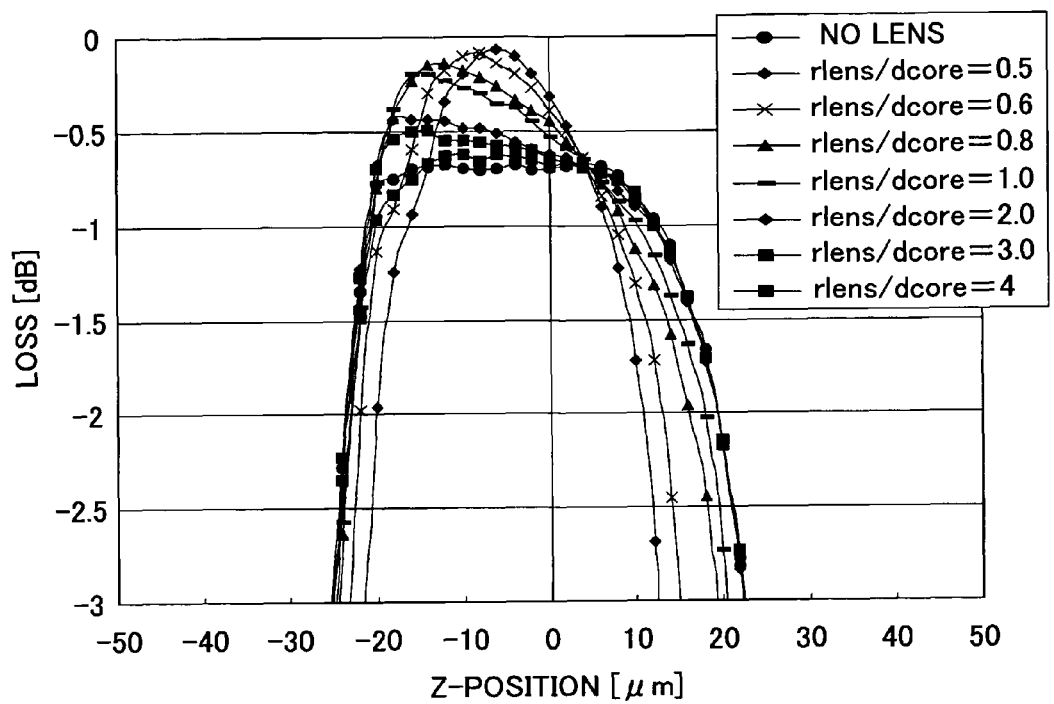
FIG. 8 is another graph for illustrating the connection loss improvement effect according to the embodiment of the present invention.
Figure 9:
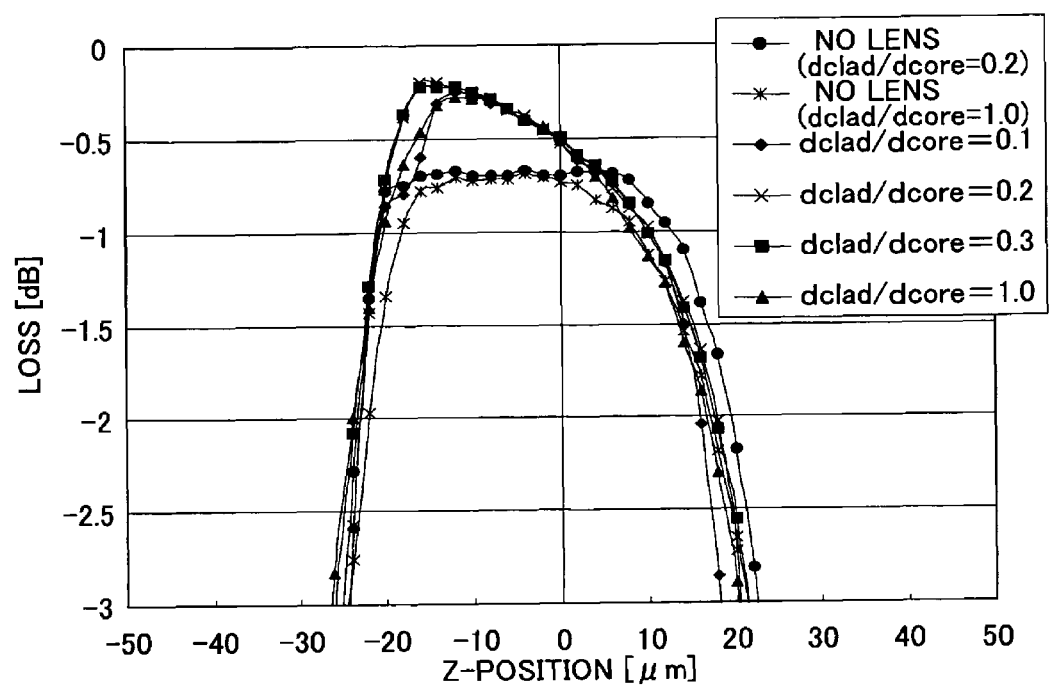
FIG. 9 is another graph for illustrating the connection loss improvement effect according to the embodiment of the present invention.

A part of the results of the above-described loss calculation is shown in FIGS. 6, 7, 8, and 9. FIG. 6 is a graph showing the relationship between the position (light source movement) in the Z-axial directions and loss at the time of lower cladding thickness/core thickness being 1.0 and lens radius of curvature/core thickness being 1.0 with respect to each relative refractive index of the lens (the refractive index of the lens layer relative to the refractive index of the core; nlens/ncore). FIG. 7 is a graph showing the relationship between the position (light source movement) in the Z-axial directions and loss at the time of lower cladding thickness/core thickness being 0.2 and lens radius of curvature/core thickness being 1.0 with respect to each relative refractive index of the lens. FIG. 8 is a graph showing the relationship between the position (light source movement) in the Z-axial directions and loss at the time of lower cladding thickness/core thickness being 0.2 and core refractive index/lens layer refractive index being 1.12 with respect to each relative radius of curvature of the lens (the radius of curvature of the lens relative to the thickness of the core; rlens/dcore). FIG. 9 is a graph showing the relationship between the position (light source movement) in the Z-axial directions and loss at the time of core refractive index/lens layer refractive index being 1.12 and lens radius of curvature/core thickness being 1.0 with respect to each relative thickness of the lower cladding (the thickness of the lower cladding relative to the thickness of the core; dclad/dcore).

The results shown in FIGS. 6 through 9 show the following. That is, coupling loss is improved by interposing a lens layer. Further, in the case of forming a lens layer in the lower cladding layer, it is desirable to satisfy the following conditions (a), (b), and (c). Each of the following conditions (a), (b), and (c) is determined to be desirable in that loss is improved and that the range of optical axis alignment is not narrowed (the amount of narrowing is less than or equal to 10%).

(a) The refractive index of the lens layer satisfies 1.0<nlens/ncore<1.3, particularly, 1.05<nlens/ncore<1.15, letting the refractive index of the core be ncore and letting the refractive index of the lens layer be nlens. This condition is determined from FIGS. 6 and 7.

(b) The radius of curvature of the lens satisfies 0.5<rlens/dcore<4.0, particularly, 1.0<rlens/dcore<3.0, letting the radius of curvature of the lens be rlens and letting the thickness of the core be dcore. This condition is determined from FIG. 8.

(c) The thickness of the lower cladding layer satisfies 0.1<dclad/dcore<1.0, particularly, 0.2<dclad/dcore<0.3, letting the thickness of the core be dcore and letting the thickness of the lower cladding layer be dclad. This condition is determined from FIG. 9.

[First Variation]

Figure 10:
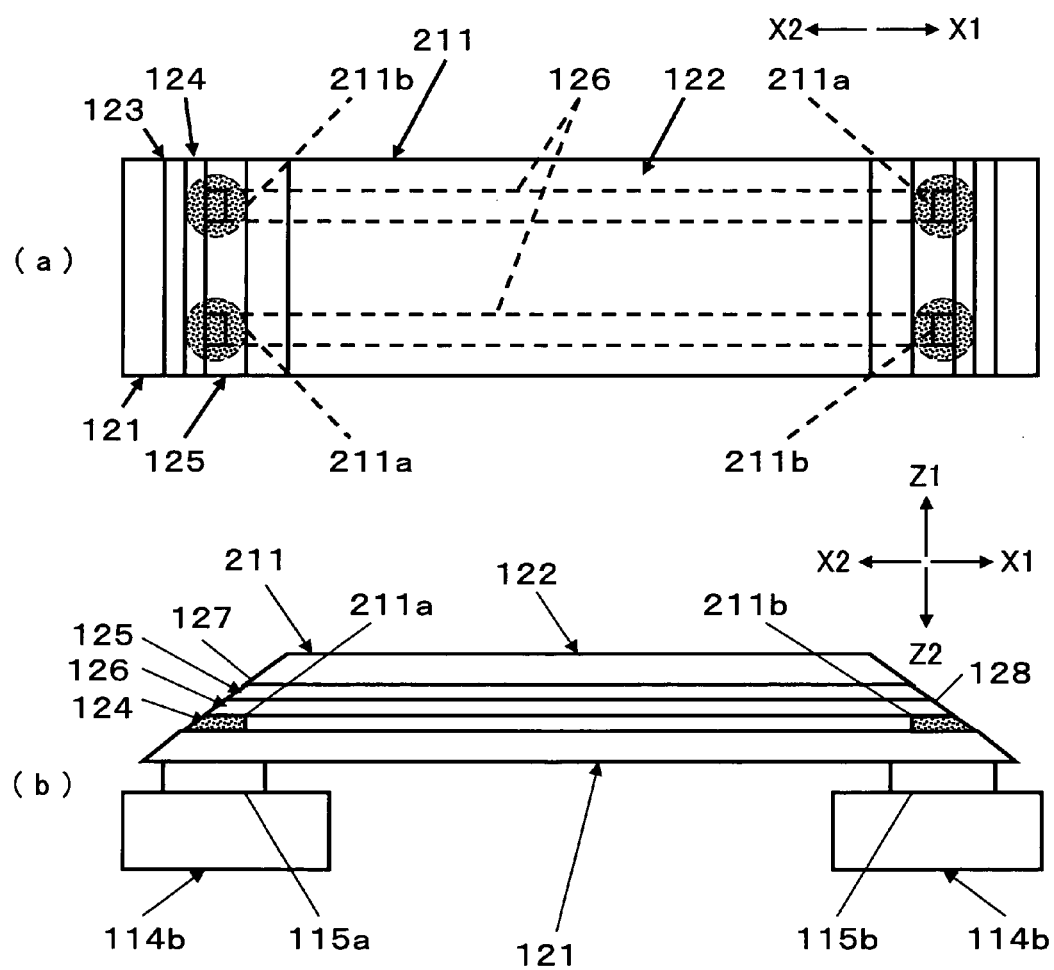
FIG. 10 is a diagram showing a configuration of a first variation of the optical interconnection device according to the embodiment of the present invention.

FIG. 10 is a diagram showing a configuration of a first variation of the optical interconnection device 116. In FIG. 10, the same elements as those of FIG. 2 are referred to by the same numerals, and a description thereof is omitted.

According to an optical interconnection device 211, which is the first variation of the optical interconnection device 116, the lens layer 123 is deleted, and lenses 211a and 211b are formed in the cladding layer 124. According to this variation, the lens layer 123 is unnecessary. Therefore, it is possible to reduce the thickness, and it is also possible to reduce the number of manufacturing processes, thus facilitating manufacturing.

[Second Variation]

Figure 11:
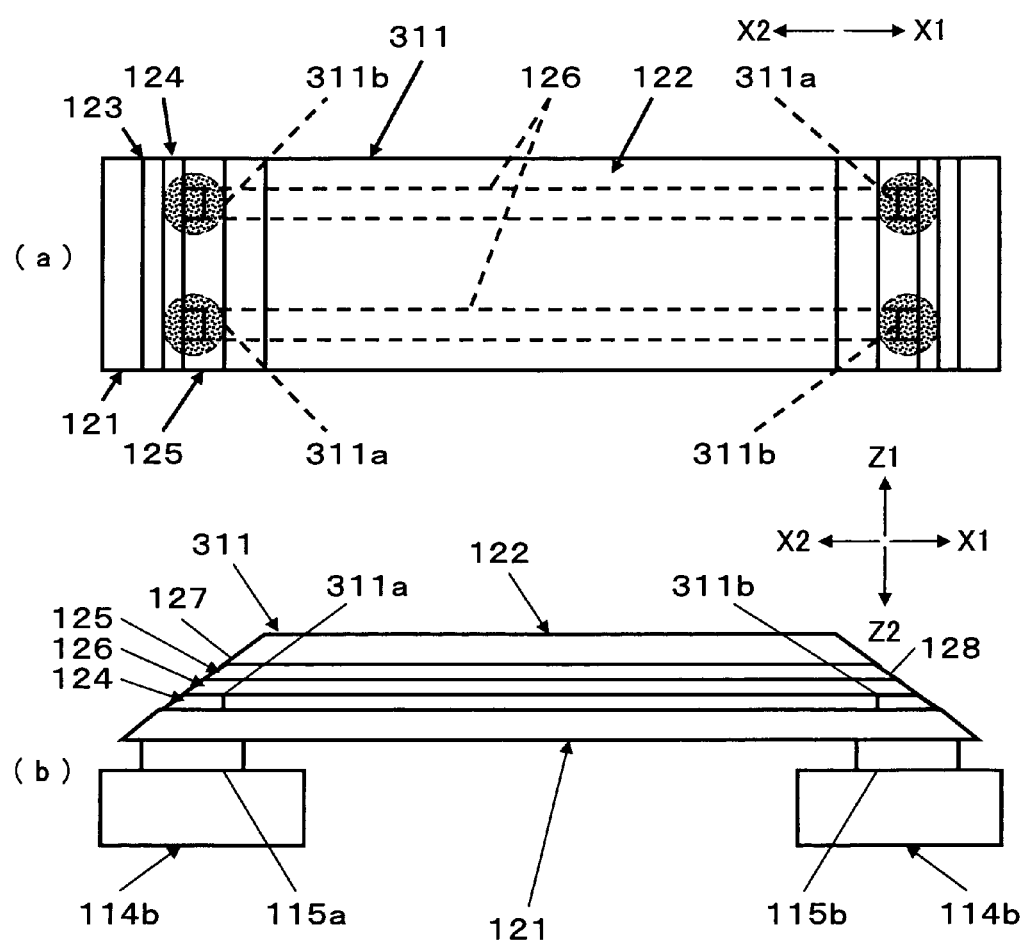
FIG. 11 is a diagram showing a configuration of a second variation of the optical interconnection device according to the embodiment of the present invention.

FIG. 11 is a diagram showing a configuration of a second variation of the optical interconnection device 116. In FIG. 11, the same elements as those of FIG. 10 are referred to by the same numerals, and a description thereof is omitted.

According to an optical interconnection device 311, which is the second variation of the optical interconnection device 116, the lenses 211a and 211b of the cladding layer 124 of the optical interconnection device 211 are replaced by light guide parts 311a and 311b.

According to this variation, a photomask is allowed to have a rectangular cross-sectional shape.

Accordingly, it is possible to manufacture the photomask with ease at low cost.

According to one embodiment of the present invention, a waveguide device (116, 211, 311) is provided that guides light through a core part (126) formed in a cladding part (124, 125) including a waveguide part (124a, 124b; 211a, 211b; 311a, 311b) formed in the cladding part so as to have the same refractive index as the refractive index of the core part so that the waveguide part communicates with the core part, and a reflective part (127, 128) configured to perform at least one of reflecting the light guided by the core part toward the waveguide part and reflecting light from the waveguide part toward a direction in which the light is guided by the core part.

In the waveguide device, the waveguide part (211a, 211b) may be formed by changing the refractive index of the cladding part (124) like a lens.

The waveguide device may further include a lens layer (123) stacked and formed on the cladding part (124), wherein the lens layer may include a lens part (123a, 123b) in the part of the lens layer corresponding to the waveguide part, the lens part collimating and gathering light.

In the waveguide device, the cladding part may include a first cladding layer (124) formed on a film substrate (121) and a second cladding layer (125) formed on the first cladding layer to enclose the core part.

In the waveguide device, the lens layer may be formed between the film substrate and the first cladding layer, and the lens part may be formed by changing the refractive index of the lens layer like a lens.

In the waveguide device, the thickness of the first cladding layer may be determined in accordance with the focal length of the lens part.

Thus, according to one embodiment of the present invention, by providing a waveguide device with a waveguide part formed in a cladding part so as to have the same refractive index as the refractive index of a core part so that the waveguide part communicates with the core part, and a reflective part configured to perform at least one of reflecting light guided by the core part toward the waveguide part and reflecting light from the waveguide part toward a direction in which the light is guided by the core part, it is possible to introduce light from a direction perpendicular to the direction in which the light is guided by the core part into the core part. Accordingly, it is possible to perform surface-mounting and reduce the thickness of the waveguide device.

[Others]

According to the above-described embodiment, the optical interconnection device is used as an optical interconnection for signal transmission between printed wiring boards. Alternatively, the optical interconnection device may be used as an optical interconnection between circuits in a printed wiring board. Further, the optical interconnection device may also be used as a waveguide device or an optical device by forming a branch therein.

The present invention is not limited to the specifically disclosed embodiment, and variations and modifications may be made without departing from the scope of the present invention.

The present application is based on Japanese Priority Patent Application No. 2005-251622, filed on Aug. 31, 2005, the entire contents of which are hereby incorporated by reference.

The invention claimed is:

1. A waveguide device, comprising:
   a film substrate;
   a lens layer formed on the film substrate
   a cladding part formed on the lens layer;
   a core part formed in the cladding part;
   a waveguide part formed in the cladding part so as to have a same refractive index as a refractive index of the core part so that the waveguide part communicates with the core part; and
   a reflective part configured to perform at least one of reflecting the light guided by the core part toward the waveguide part and reflecting light from the waveguide part toward a direction in which the light is guided by the core part.

2. The waveguide device as claimed in claim 1, wherein the waveguide part has the refractive index different from a refractive index of the cladding part and serves as a lens.

3. The waveguide device as claimed in claim 1,
   wherein the lens layer includes a lens part in a part of the lens layer corresponding to the waveguide part, the lens part collimating and gathering light.

4. The waveguide device as claimed in claim 3, wherein
   the lens part has a refractive index different from a refractive index of a part of the lens layer other than the lens part.

5. The waveguide device as claimed in claim 1, wherein the cladding part includes a first cladding layer formed on the lens layer and a second cladding layer formed over the first cladding layer so as to enclose the core part.

6. The waveguide device as claimed in claim 5, wherein the lens layer includes a lens part in a part of the lens layer corresponding to the waveguide part, the lens part collimating and gathering light, and
   a thickness of the first cladding layer is determined in accordance with a focal length of the lens part.

\* \* \* \* \*